United States Patent [19]

Gunesin

[11] Patent Number: 4,942,209
[45] Date of Patent: Jul. 17, 1990

[54] ANIONIC POLYMERIZATION IN HIGH VISCOSITY DISPERSING MEDIUM TO FORM MICROPARTICLES WITH NARROW SIZE DISTRIBUTION

[75] Inventor: Binnur Z. Gunesin, New York, N.Y.

[73] Assignee: Mobil Oil Corporation, New York, N.Y.

[21] Appl. No.: 311,003

[22] Filed: Feb. 14, 1989

Related U.S. Application Data

[63] Continuation-in-part of Ser. No. 134,731, Dec. 18, 1987, abandoned.

[51] Int. Cl.$^5$ .............................. C08F 2/14; C08F 4/48
[52] U.S. Cl. .................................. 526/173; 526/201; 526/346; 526/909
[58] Field of Search ...................... 526/173, 201, 346

[56] References Cited

U.S. PATENT DOCUMENTS

| | | |
|---|---|---|
| 3,281,383 | 10/1966 | Zelinski et al. . |
| 3,402,160 | 9/1968 | Hayes .................................. 526/173 |
| 3,639,517 | 2/1972 | Kitchen et al. . |
| 3,770,712 | 11/1973 | Schwab ................................ 526/173 |
| 4,220,738 | 9/1980 | Miki et al. . |
| 4,247,434 | 1/1981 | Vanderhoff et al. . |
| 4,386,125 | 5/1983 | Shiraki et al. . |
| 4,829,135 | 5/1989 | Gunesin et al. . |
| 4,839,418 | 6/1989 | Schwaben et al. ................... 525/53 |

*Primary Examiner*—Edward J. Smith
*Attorney, Agent, or Firm*—Alexander J. McKillop; Charles J. Speciale; Stanislaus Aksman

[57] ABSTRACT

The viscosity of the dispersing medium, such as cyclohexane, in the anionic dispersion polymerization of monomers, such as styrene, is increased by adding a higher viscosity inert miscible liquid, such as hexadecane, or a soluble inert solid, or by using a liquid having a viscosity of greater than about 2 cp. The increased viscosity assists in the formation of dispersed polymer particles having a narrower particle size distribution than those produced in the lower viscosity dispersing medium.

20 Claims, No Drawings

ANIONIC POLYMERIZATION IN HIGH VISCOSITY DISPERSING MEDIUM TO FORM MICROPARTICLES WITH NARROW SIZE DISTRIBUTION

CROSS-REFERENCE TO RELATED APPLICATION

This is a continuation-in-part of application Ser. No. 134,731, filed on Dec. 18, 1987, now abandoned.

BACKGROUND OF THE INVENTION

There has been considerable interest in developing methods for preparing monodisperse polymer particles, i.e., having a narrow particle size distribution, particularly with particle sizes greater than about 2 microns. One polymer of particular interest in this application is polystyrene.

As disclosed in U.S. Pat. No. 4,247,434, which is incorporated herein by reference, microparticles in latex form find utility in a number of applications and yet other applications are awaiting the development of monodisperse polymer particles having a particle size greater than 2 microns. Such polymer particles are used as a reference standard for the calibration of various instruments, in medical research and in medical diagnostic tests.

The difficulty of preparing monodisperse polymer particles is evident from U.S Pat. No. 4,247,434 in which the polymerization is conducted in microgravity, such as in outer-space.

In accordance with this invention the ability to prepare polymer particles in a narrow particle size distribution is enhanced by the use of a more viscous medium during anionic dispersion polymerization.

SUMMARY OF THE INVENTION

Polymer microparticles in a narrow size distribution are obtained by anionic dispersion polymerization in a dispersing medium, preferably containing a dispersing agent, which is a non-solvent for the polymer. Instead of using typical dispersing media, such as lower hydrocarbons, more viscous media with a viscosity of at least 2 cp at 20° C. are utilized to narrow the particle size distribution. The more viscous media can comprise higher aliphatic hydrocarbons, such as hexadecane or heptadecane, mixtures of such higher aliphatic hydrocarbons and a conventional dispersing medium such as hexane or cyclohexane, or can comprise a low viscosity viscous medium, such as hexane or cyclohexane, containing an inert soluble solid polymer which will increase viscosity of the system.

DETAILED DESCRIPTION OF THE INVENTION

The general process conditions suitable for preparation of the polymer microparticles of this invention are described in U.S. Pat. No. 3,770,712, except that lower temperatures of reaction are preferred here. U.S. Pat. No. 3,770,712 is incorporated herein by reference in its entirety.

This invention is applicable to the homopolymerization or copolymerization, but preferably to homopolymerization, of anionically polymerizable monomers generally but particularly vinyl aromatic monomers, such as styrene and substituted styrenes. Suitable substituted styrenes include alkyl substituted styrenes, particularly methyl-substituted styrenes, such as ortho-, meta- or para-methylstyrene. Styrenes with polar groups, such as chloride substituents, cannot be used in anionic polymerization. Other anionically polymerizable monomers include 2-vinylpyridine, 4-vinylpyridine, ethylene oxide, methacrylonitrile, acrylonitrile, isoprene, butadiene, dimethyl-butadiene, vinyl naphthalene and vinyl biphenyl.

If the process of the invention is used to prepare copolymers of the aforementioned anionically polymerizable monomers, more particularly copolymers of styrene or at least one substituted styrene wIth the other anionically polymerizable monomers identified above, such as 2-vinylpiridine, 4-vinylpiridine, ethylene oxide, isoprene or butadiene, it can be used to prepare either random o block copolymers.

Random copolymers are prepared in the anionic polymerization process of this invention in the presence of a modifier, such as tetrahydrofuran, tetramethylethylenediamine, K-amylate or t-butylphosphate, to randomize the distribution of the other anionically polymerizable monomers on the polystyrene or poly-substituted styrene backbone. The amount of the modifier is at least double, on the molar basis, of the amount of the anionic catalyst used in the anionic polymerization process.

Block copolymers, as is known to those skilled in the art, are prepared in the absence of the modifier. The block copolymers have 2 or more, e.g., 3–10, alternating blocks of (A) units of polystyrene or poly-substituted styrene and (B) units of the other anionically polymerizable monomers. If the block copolymer contains 3 or more blocks, it is preferred that the terminal blocks are (A) blocks. Thus, a block copolymer containing 5 blocks has the configuration A- B- A- B- A.

"Star-block" or radial copolymers of the styrene and the other anionically polymerizable monomers or starblock copolymers of the substituted styrene and the other anionically polymerizable monomers having a non-linear configuration, such as those described in U.S. Pat. Nos. 3,639,517 and 4,091,053, both of which are incorporated herein by reference, may also be produced in the process of this invention.

The homopolymers and copolymers produced in the process of this invention have molecular weights of about 10,000 to about 1,000,000. The molecular weight of the copolymer is not critical to the ability of the process to produce monodisperse particles in accordance with this invention.

Suitable anionic catalysts include butyl-lithium, sec-butyl-lithium and t-butyl-lithium. The concentration of the catalyst is generally less than $10^{-3}$, preferably $0.3 \times 10^{-3}$ to $0.8 \times 10^{-3}$ moles per mole of monomer.

The reaction is conducted in an inert medium, having a viscosity greater than 2.0 cp. which is a non-solvent for the polymer. Paraffinic or cycloaliphatic hydrocarbons having between about 4 and 7 carbon atoms can be used as one component of the medium with a higher viscosity agent added to achieve a system viscosity of 2.0 or greater. Aromatic hydrocarbons and polar solvents are not suitable. Examples of materials of useful slurry media are butane, isobutane, pentane, isopentane, hexane, heptane, 2,2-dimethyl-butane, petroleum ether and cyclohexane. The second component of the slurry medium can be any suitable inert liquid which is miscible with the first component and which has a higher viscosity, or it can be a solid or semi-solid which is inert in the reaction and which increases viscosity of the slurry medium so that the desired viscosity of 2.0 cp or greater for the medium is achieved.

Inert liquids which can be used include paraffins having 14 or more carbon atoms, such as tetradecane, hexadecane, octadecane, eicosane and the like. Liquid oligomers of olefins, such as ethylene, and higher olefins, such as decene, are also suitable.

Suitable solids or semi-solids for increasing the viscosity of a low viscosity slurry liquid include the higher paraffins, higher oligomers of ethylene or olefins having 3 to 12 carbon atoms, soluble low molecular weight polymers of styrene, polysiloxanes and the like.

The process of polymerization can be carried out at temperatures between 0° C. and about 100° C. but preferably between about 0° C. and 25° C. It is contemplated that the reaction can be conducted under pressure with a solvent, such as isobutane, which is highly volatile at the reaction temperature. Such a highly volatile solvent and pressure reaction conditions are advantageous in separating the polymer particles from the slurry medium.

The polymeric dispersing agent which is used to maintain the polymer in suspension as it is formed is advantageously a block copolymer, particularly an A-B diblock copolymer in which the A block is styrene and the B block is an aliphatic monomer block of butadiene, isoprene, hydrogenated isoprene or similar monomers. The dispersing agent is generally present in amounts of about 0.1 to 5.0 weight percent of the monomers.

The polymerization reaction is preferably conducted without agitation, and violent agitation or mixing is generally not considered desirable.

The invention is illustrated by the following non-limiting example in which all parts are by weight unless otherwise specified.

EXAMPLE

In a 500 ml bottle, 1.2 g of styrene/butadiene block copolymer (SF7028 from Firestone) was dissolved in 40 g of styrene. Later a mixture of 125 ml of hexadecane and 75 ml of cyclohexane was added with 0.1 cc of phenanthroline solution and 0.4 cc of tetrahydrofuran (THF). The bottle was capped and purged with $N_2$ through the liquid phase for 10 minutes. Sec-butyl lithium (0.2 cc of 1.4 molar) was injected through the cap and mildly mixed with solution until the orange color was obtained. At this stage, the polymerization bottle was placed into water bath (20° C.) without tumbling. Polymerization was completed to 100% conversion in 2 hrs. The final particles show a particle size distribution (Dw/Dn) of 1.19 and an average particle size of about 3.5 microns.

I claim:

1. A process for the polymerization of an anionically polymerizable vinyl aromatic monomer to obtain a particle size distribution(Dw/Dn) or 1.2 or less by conducting the polymerization at a temperature of 0° to 25° C. in the presence of an anionic polymerization catalyst in a dispersing medium having a viscosity of at least about 2.0 cp at 20° C. which is not a solvent for the polymerized monomer, said dispersing medium containing a dispersing agent which is an A-B diblock copolymer wherein the A block is styrene and the B block is butadiene, isoprene or hydrogenated isoprene.

2. The process of claim 1 in which the dispersing medium comprises at least one liquid aliphatic hydrocarbon having a viscosity of at least about 2.0 cp at 20° C.

3. The process of claim 2 in which the dispersing medium comprises a $C_{14}$–$C_{30}$ aliphatic hydrocarbon.

4. The process of claim 3 in which said monomer is styrene.

5. The process of claim 1 in which the anionic polymerization catalyst is sec-butyl lithium.

6. The process of claim 2 in which the anionic polymerization catalyst is sec-butyl lithium.

7. The process of claim 3 in which the anionic polymerization catalyst is sec-butyl lithium.

8. The process of claim 4 in which the anionic polymerization catalyst is sec-butyl lithium.

9. The process of claim 8 in which the dispersing medium is a mixture of hexadecane and cyclohexane and said monomer is styrene.

10. The process of claim 9 in which the dispersing medium is a mixture of hexadecane and cyclohexane in volumetric ratio of 1.67:1.0, the polymeric dispersing agent is a styrene/butadiene block copolymer, the process being conducted at 20° C. without tumbling to produce particles having the particle size distribution (Dw/Dn) of 1.19 and an average particle size of about 3.5 microns.

11. The process of claim 8 in which the dispersing agent is present in the amount of about 0.1 to 5.0 weight percent of the monomers.

12. The process of claim 11 in which the concentration of the catalyst in the dispersing medium is less than $10^{-3}$ moles per mole of the monomer.

13. The process of claim 2 in which the dispersing medium is comprised of two components: first component being butane, isobutane, pentane, isopentane, hexane, heptane, 2,2-dimethyl-butane, petroleum ether or cyclohexane, and the second component being any suitable inert liquid miscible with the first component and having a higher viscosity than the first component, a solid or a semi-solid which increases the viscosity of the first component so that the viscosity of the dispersing medium is at least about 2.0 cp at 20° C.

14. The process of claim 13 in which the inert liquid is a paraffin containing 14 or more carbon atoms.

15. The process of claim 14 in which the inert liquid is tetradecane, hexadecane, octadecane, or eicosane.

16. The process of claim 3 in which the vinyl aromatic monomer is styrene or a substituted styrene.

17. The process of claim 16 in which the substituted styrene is para-methylstyrene.

18. The process of claim 12 in which the concentration of the catalyst in the dispersing medium is $0.3 \times 10^{-3}$ to $0.8 \times 10^{-3}$ moles per mole of monomer.

19. The process of claim 15 in which the concentration of the catalyst in the dispersing medium is less than $10^{-3}$ moles per mole of the monomer.

20. The process of claim 19 in which the concentration of the catalyst in the dispersing medium is $0.3 \times 10^{-3}$ to $0.8 \times 10^{-3}$ moles per mole of the monomer.

* * * * *